No. 727,516. PATENTED MAY 5, 1903.
H. A. WEBSTER.
SOLE LEVELING MACHINE.
APPLICATION FILED AUG. 13, 1902.
NO MODEL. 6 SHEETS—SHEET 1.

WITNESSES:
INVENTOR:
H. A. Webster

No. 727,516. PATENTED MAY 5, 1903.
H. A. WEBSTER.
SOLE LEVELING MACHINE.
APPLICATION FILED AUG. 13, 1902.
NO MODEL. 6 SHEETS—SHEET 2.

WITNESSES:
E. D. Batchelder
George Pezzetti

INVENTOR:
H. A. Webster
by Wright Brown & Quinby
attys.

No. 727,516. PATENTED MAY 5, 1903.
H. A. WEBSTER.
SOLE LEVELING MACHINE.
APPLICATION FILED AUG. 13, 1902.
NO MODEL. 6 SHEETS—SHEET 5.

WITNESSES:
E. Batchelder
George Pizzetti

INVENTOR:
H. A. Webster
by Wright Brown Quinby
Attys.

No. 727,516. PATENTED MAY 5, 1903.
H. A. WEBSTER.
SOLE LEVELING MACHINE.
APPLICATION FILED AUG. 13, 1902.
NO MODEL. 6 SHEETS—SHEET 6.
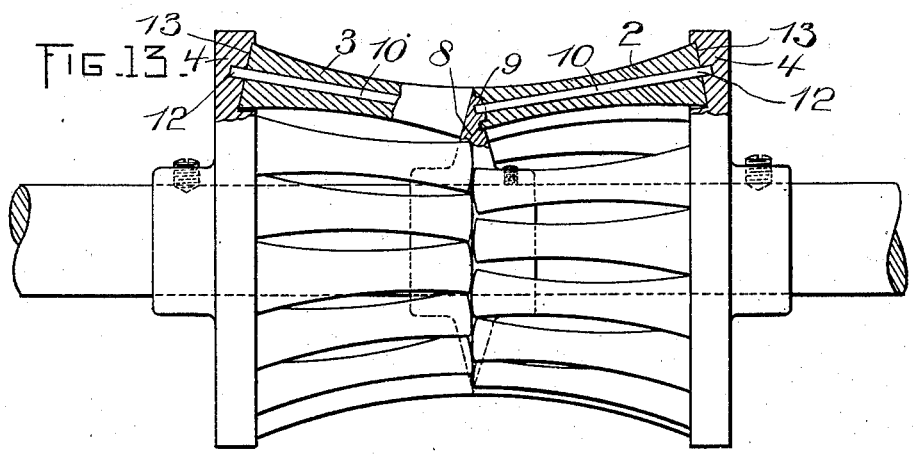
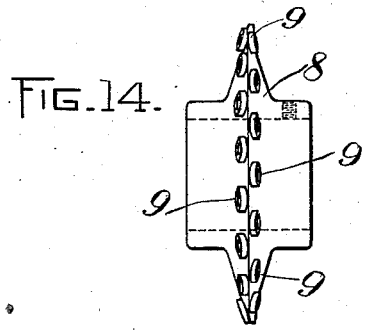
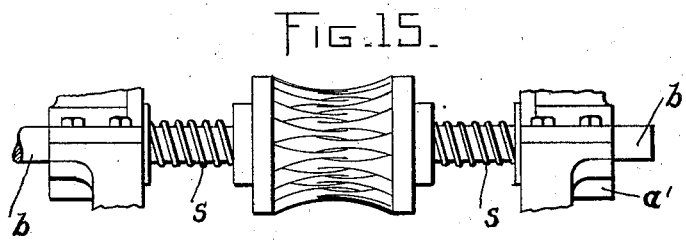
WITNESSES. INVENTOR.

No. 727,516. Patented May 5, 1903.

UNITED STATES PATENT OFFICE.

HAROLD A. WEBSTER, OF HAVERHILL, MASSACHUSETTS, ASSIGNOR TO WEBSTER SHOE MACHINE COMPANY, OF HAVERHILL, MASSACHUSETTS, A CORPORATION OF MAINE.

SOLE-LEVELING MACHINE.

SPECIFICATION forming part of Letters Patent No. 727,516, dated May 5, 1903.

Application filed August 13, 1902. Serial No. 119,514. (No model.)

*To all whom it may concern:*

Be it known that I, HAROLD A. WEBSTER, of Haverhill, in the county of Essex and State of Massachusetts, have invented certain new and useful Improvements in Sole-Leveling Machines, of which the following is a specification.

This invention relates to sole-leveling machines in which the boot or shoe having the sole to be leveled is supported by a jack which is movable back and forth relatively to a rotary leveling-tool which acts upon the sole in such manner as to impart to the outer sole its final form, at the same time compacting its surface.

The invention consists in the several improvements which I will now proceed to describe and claim.

Figure 1:
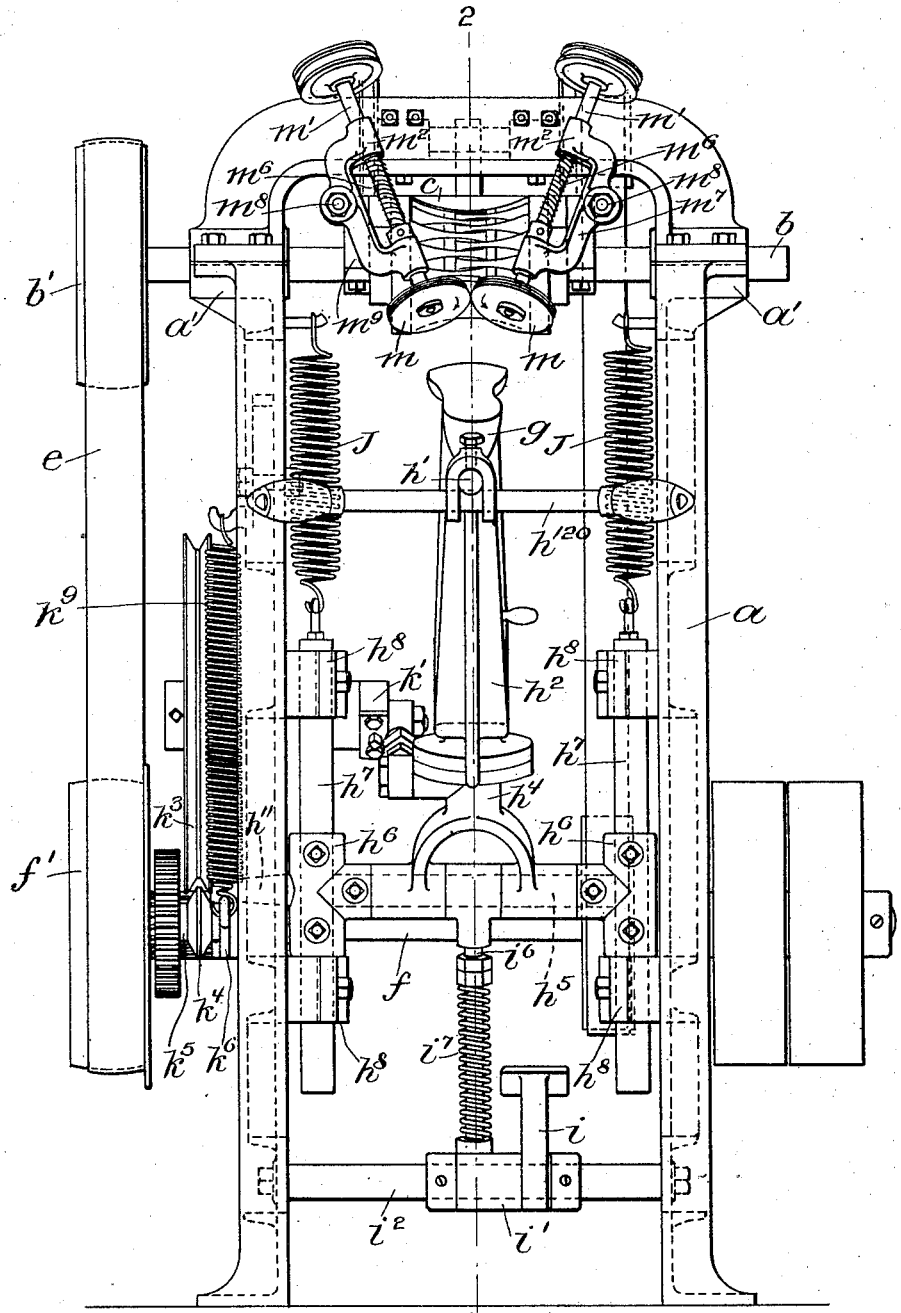
Figure 2:
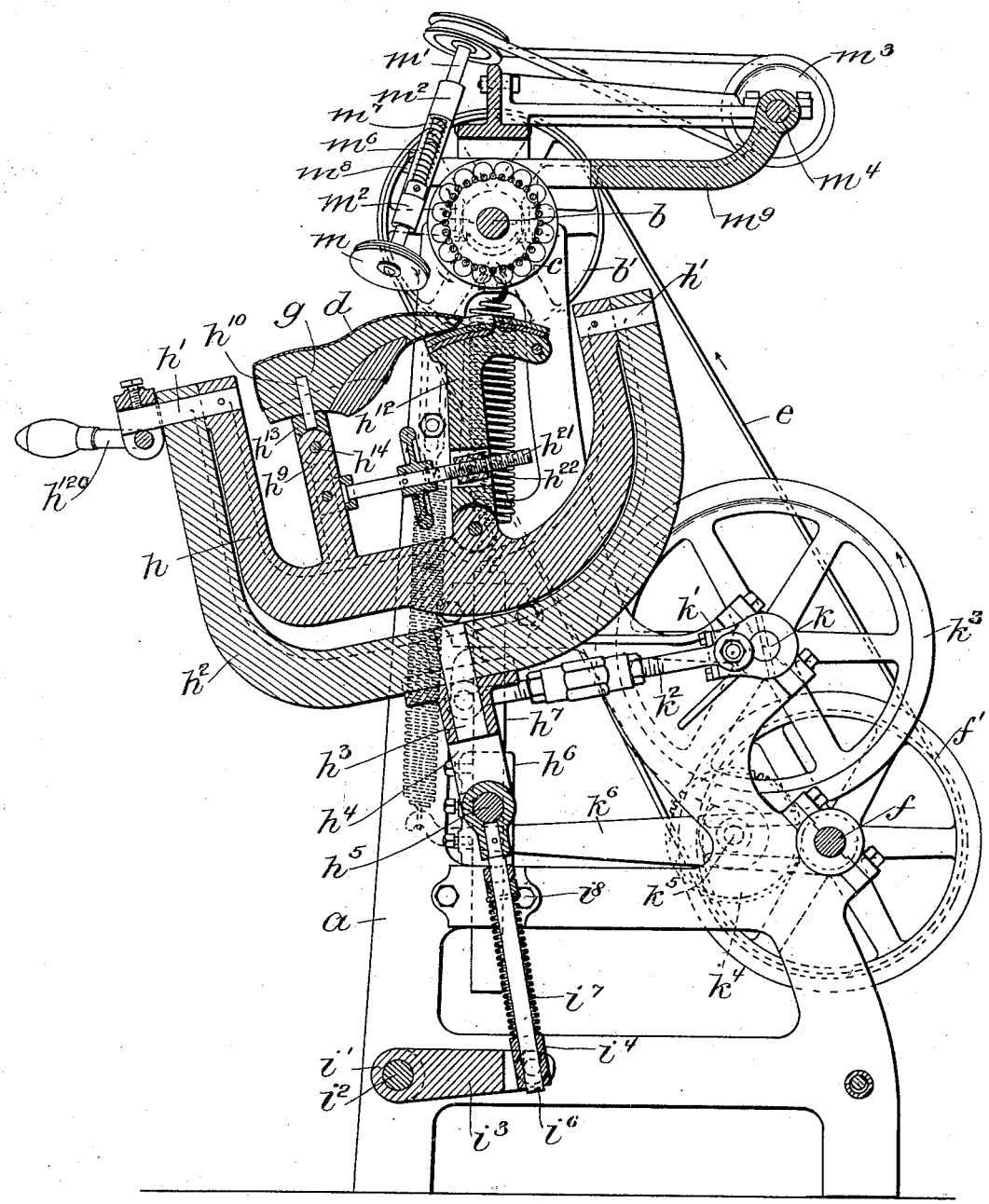
Figure 3:
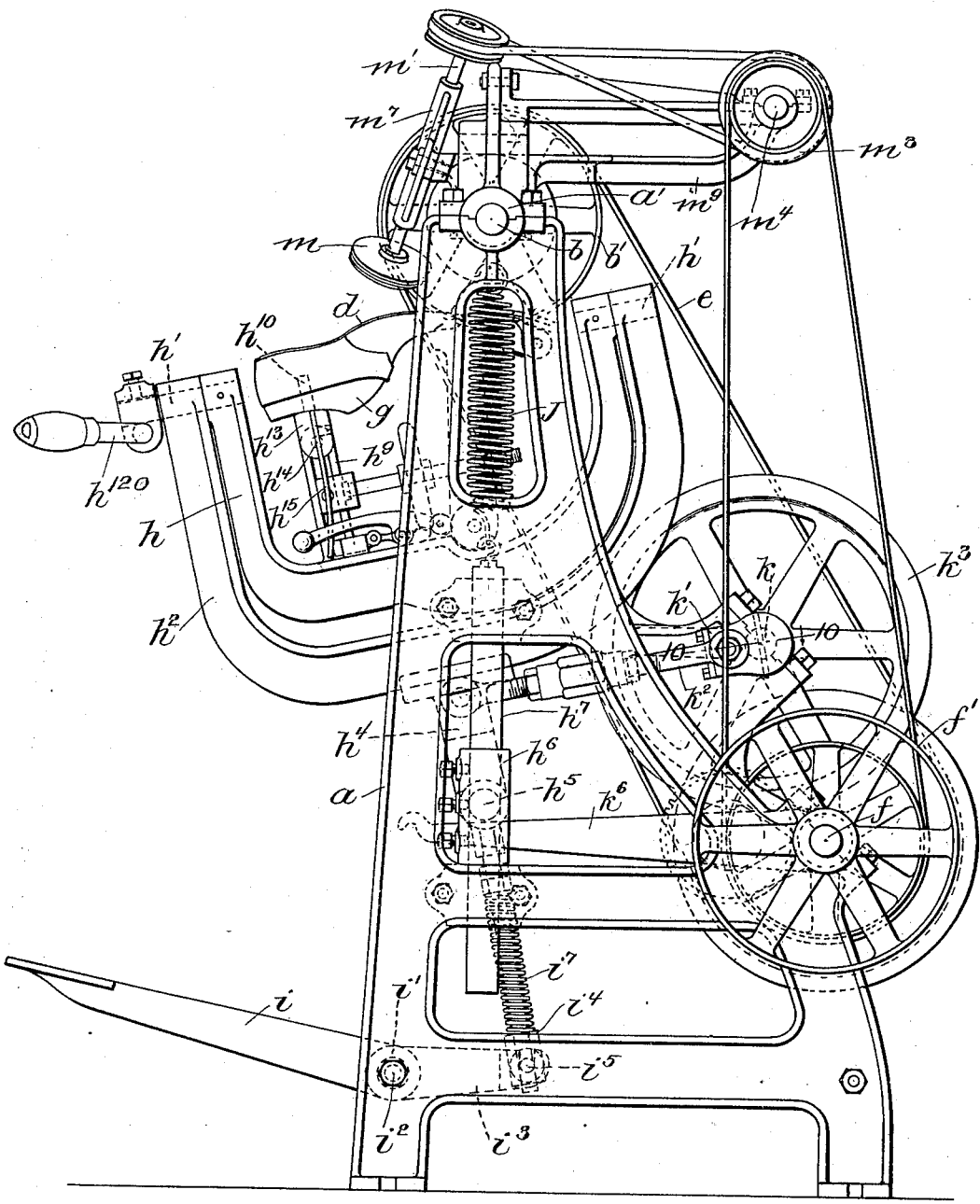
Figure 4:
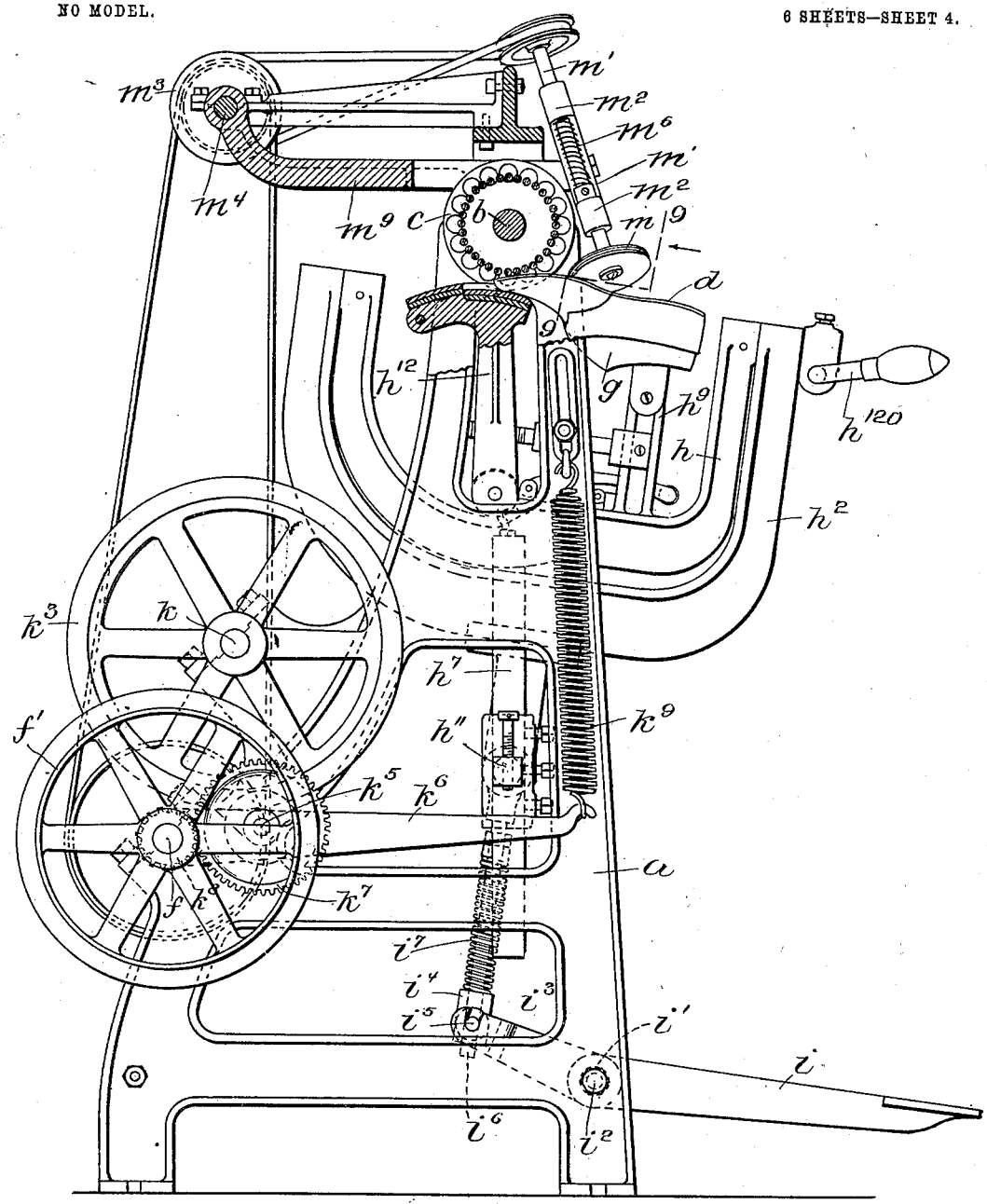
Figure 5:
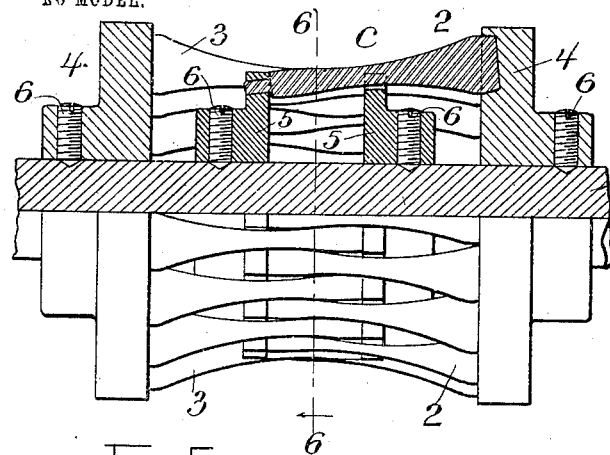
Figure 6:
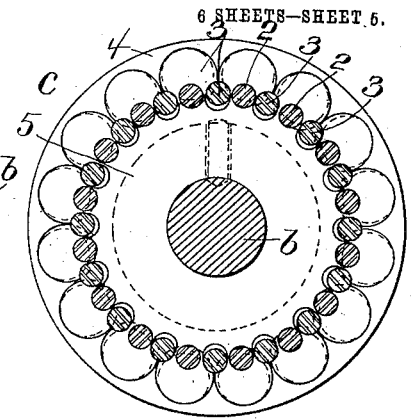
Figure 7:
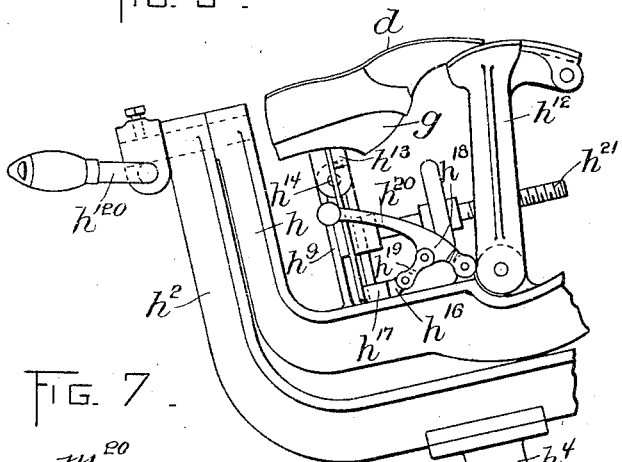
Figure 8:
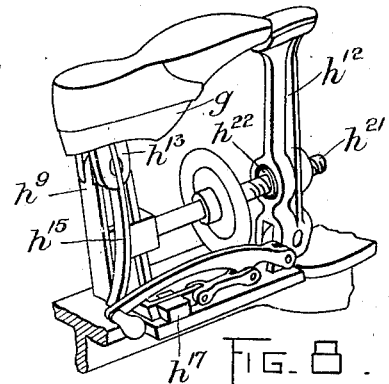
Figure 9:
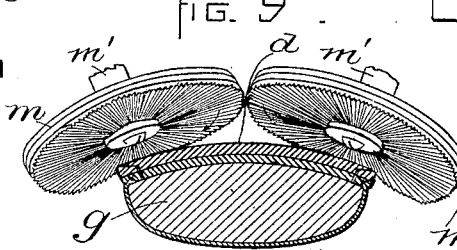
Figure 10:
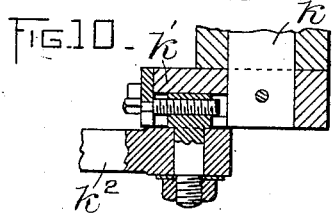

Of the accompanying drawings, forming a part of this specification, Figure 1 represents a front elevation of a sole-leveling machine embodying my invention. Fig. 2 represents a section on line 2 2 of Fig. 1. Fig. 3 represents a side elevation of the machine. Fig. 4 represents an elevation from the opposite side of the machine, certain parts being shown in section. Fig. 5 represents a partial side elevation and a partial longitudinal section of the rotary leveling-tool. Fig. 6 represents a section on line 6 6 of Fig. 5. Fig. 7 represents a partial side elevation of the jack which supports the boot or shoe during the leveling operation. Fig. 8 represents a perspective view showing parts of said jack. Fig. 9 represents a section on line 9 9 of Fig. 4 looking toward the left. Fig. 10 represents a section on line 10 10 of Fig. 3. Figs. 11, 12, 13, and 14 represent modifications hereinafter referred to. Fig. 15 represents a fragmentary view showing another modification.

The same reference characters indicate the same parts in all the figures.

In the drawings, $a$ represents the supporting-frame of the machine, and $b$ represents a shaft, which is journaled in bearings $a'$ $a'$, forming parts of the supporting-frame. To said shaft is affixed a rotary leveling-tool $c$, which has a longitudinally-curved and ribbed perimeter adapted to impart to a sole $d$ the usual transverse curvature. The perimeter or acting portion of the leveling-tool $c$ is composed of a plurality of rolls 2 3, which collectively form a longitudinally-curved and ribbed cylindrical surface or perimeter having enlarged end portions and a reduced central portion, as clearly shown in Fig. 5. The rolls 2 and 3 are journaled to rotate loosely in hubs 4 4 and 5 5. The longitudinal curvature of the ribbed periphery of the rolls is due to the following facts—namely, first, the peripheries of the rolls are longitudinally curved, and, secondly, the axes of the rolls are arranged obliquely to the axis of the shaft $b$. The outer ends of the series of rolls 2 are journaled in one of the end hubs 4, while the outer ends of the series of rolls 3 are journaled in the opposite end hub 4. The inner ends of the two series of rolls are journaled in the intermediate hubs 5 5. The relative arrangement of the end hubs 4 4 and intermediate hubs 5 5 is such that the inner ends of the two series of rolls project by and alternate with each other, so that the inner end of each roll projects between the inner ends of the two adjoining rolls. The bearings of the outer ends of the rolls are farther from the axis of the shaft than the bearings of the inner ends of the rolls, so that the axes of each series of rolls converge toward the axis of the shaft $b$, and this fact, in connection with the longitudinal curvature of the peripheries of the rolls, gives the ribbed perimeter of the leveling-tool the desired longitudinal curvature, which conforms to the transverse curvature which is to be possessed by the tread-surface of the sole after the leveling operation.

It will be seen by reference to Figs. 5 and 6 that the rolls are in close proximity to each other at the central portion, as well as at the end portions, of the perimeter of the tool, so that they present a series of ribs or rounded surfaces adapted to act effectively on the sole in removing irregularities from its surface and in condensing and compacting said surface. The rolls are tapered or gradually reduced in diameter from their outer ends toward their inner ends, the variation in diameter of the different parts of the rolls corresponding to the difference in the distance of the different parts of the rolls from the shaft $b$. The hubs 4 4 and 5 5 are affixed to the shaft $b$ in any suitable manner, such as by set-screws 6.

In the preferred construction of the tool (shown in Figs. 1, 5, 6, and 11) the number of rolls composing the central portion or zone of the perimeter of the tool is greater or double the number composing the end portions or zones thereof, the diameter of the rolls at the central portion being less than at the end portions. This increase in number and decrease in diameter of the rolls at the central portion of the perimeter avoids the formation of undesirably wide spaces between the rolls and makes the tool practically continuous longitudinally, there being no interruption of the continuity at the longitudinal center of the perimeter.

The shaft $b$ is preferably adapted to slide longitudinally in its bearings $a'$ $a'$ to permit an endwise movement of the leveling-tool $c$. The shaft $b$ and the leveling-tool are or may be rotated by any suitable means, such as a belt $e$, running from a pulley $f'$ on the driving-shaft $f$ to a pulley $b'$ on the shaft $b$. The draft or strain of the belt $e$ on the crowning peripheries of the pulleys $f'$ and $b'$ automatically keeps the shaft $b$ and leveling-tool $c$ in a central position or midway between the extremes of its longitudinal movement or excursion, so that the reduced central portion of the leveling-tool is automatically kept centered relatively to the jack, hereinafter described, which supports the sole $d$ to be leveled. If desired, however, the shaft $b$ and leveling-tool $c$ may be kept automatically centered by a suitable arrangement of springs which will permit a longitudinal movement of the shaft and leveling-tool in either direction from a central position and will automatically tend to restore the tool and shaft to said position.

In Fig. 15 I have shown springs $s$ $s$ interposed between the ends of the leveling-tool and the portions of the frame in which the shaft $b$ is supported, said springs being adapted to yieldingly hold the leveling-tool in a central position.

The jack which supports the last $g$ on which the boot or shoe is mounted comprises an inner yoke $h$, having trunnions $h'$ $h'$, an outer yoke $h^2$, having bearings for said trunnions, said outer yoke having a downwardly-projecting central trunnion $h^3$, an oscillatory arm or holder $h^4$, in which the trunnion $h^3$ is journaled, said arm or holder $h^4$ being journaled on a horizontal stud $h^5$, to the ends of which are affixed sleeves $h^6$ $h^6$, to which in turn are affixed vertical sliding studs $h^7$ $h^7$, movable in fixed guides $h^8$ $h^8$ on the supporting-frame. The yoke $h$ is provided with a fixed standard $h^9$, supporting a jack spindle or pin $h^{10}$, adapted to enter the spindle-socket in the heel portion of the last $g$. To the inner yoke portion $h$ is pivotally connected a toe-rest $h^{12}$, adapted to support the toe portion of the last and the boot or shoe upper thereon. Suitable means are employed for securing the last to the jack, as hereinafter described.

It will be seen that the last $g$ is adapted to be moved and adjusted as follows: First, the oscillations of the arm or holder $h^4$ on the stud $h^5$ permit the jack as a whole to oscillate in a plane at right angles with the axis of the leveling-tool; second, the connection between arm $h^4$ and the outer yoke $h^2$ afforded by the trunnion $h^3$ enables the median line of the last to be adjusted so that it is either at right angles to the axis of the leveling-tool or at various other angles relatively thereto; third, the connection between the inner yoke $h$ and the outer yoke $h^2$ afforded by the trunnions $h'$ enables the inner yoke and the last to be oscillated laterally; fourth, the slides $h^7$, attached, as described, to the stud $h^5$ and vertically movable in the guides $h^8$, enables the jack as a whole to be raised and lowered, so that the sole supported by the jack will be pressed upwardly against the ribbed and longitudinally-curved perimeter of the leveling-tool.

The jack is normally held by its own weight in the depressed position shown in Figs. 1, 2, and 3, so that a sole on the jack is normally out of contact with the leveling-tool. Means are provided whereby the operator after jacking the boot or shoe may raise the jack to press the sole thereon against the leveling-tool, said means, as here shown, comprising a treadle $i$, affixed to a sleeve $i'$, which is mounted to oscillate on a fixed stud $i^2$, a lever $i^3$, affixed to said sleeve, and a yielding connection between the lever $i^3$ and the arm or holder $h^4$. Said connection includes a collar $i^4$, having trunnions $i^5$, Fig. 4, resting in bearings in the forked end of the lever $i^3$, a rod $i^6$, attached at its upper end to a socketed boss on the stud $h^5$, its lower end being adapted to slide in the collar $i^4$, and a spring $i^7$, interposed between a shoulder $i^8$ on the rod $i^6$ and the collar $i^4$. When the operator depresses the treadle $i$, the lever $i^3$ is raised, and its upward movement is imparted yieldingly through the spring $i^7$ to the jack, so that the sole is pressed yieldingly against the leveling-tool.

The weight of the jack is partially counterbalanced by springs $j$ $j$, attached at their upper ends to fixed supports on the frame and at their lower ends to the slides $h^7$ $h^7$, said springs assisting in raising the jack when the treadle is depressed.

Mechanism is provided for oscillating the jack in a plane at right angles to the axis of the leveling-tool, and thus causing the sole to move back and forth endwise in contact with said tool. Said mechanism is preferably organized to be inoperative when the jack is depressed and to become operative when the jack is raised, so that the jack is oscillated only when raised, its motion ceasing when it is depressed. As here shown, said mechanism includes a short crank-shaft $k$, journaled in a fixed bearing on the frame of the machine and having a crank $k'$, and a rod or pitman $k^2$, connecting the crank with the oscillatory arm or holder $h^4$ of the jack. The crank-shaft $k$ is provided with a clutch member, preferably a peripherally-grooved friction-wheel $k^3$. $k^4$ is a complemental friction member, formed in this case as a wheel having an angular periphery formed, as shown in Fig. 1, to fit the groove of the wheel or member $k^3$. The member $k^4$ is affixed to a shaft $k^5$, journaled in a bearing on a lever $k^6$, which is adapted to oscillate in a vertical plane on the driving-shaft. To the shaft $k^5$ is affixed a gear $k^7$, meshing with a gear $k^8$, affixed to the driving-shaft $f$. The shaft $k^5$ and friction-wheel $k^4$ are therefore continuously rotated. A spring $k^9$, attached at one end to the frame of the machine and at the other end to the lever $k^6$, normally raises said lever and the friction-wheel $k^4$ with sufficient force to cause the latter to engage and rotate the grooved wheel $k^3$, and thus impart motion to the jack. The spring $k^9$ is prevented, however, from thus acting when the jack is depressed by the weight of the jack exerted through an arm $h^{11}$, projecting from one of the sleeves $h^6$ and bearing on the lever $k^6$ when the jack is depressed, so that the weight of the jack holds the lever in a depressed position, with the friction-wheel $k^4$ out of contact with the friction-wheel $k^3$. When the jack is raised, the spring $k^9$ is allowed to act and holds the two friction-wheels continuously in engagement until the jack is again depressed, the engagement of said friction-wheels being therefore maintained by means independent of the force exerted by the operator when the sole is being pressed against the leveling-tool.

A handle-bar $h^{120}$, having handles at its ends, is attached to the forward trunnion $h'$ of the jack. The operator is enabled by grasping the handles to tip the inner yoke $n$ in either direction, and thus tip the sole sidewise and to turn the outer yoke to vary the direction of the median line of the sole relatively to the axis of the leveling-tool. Provision is thus made for bringing all parts of the outer surface of the sole into effective contact with the leveling-tool. When the median line of the sole is substantially at right angles with the axis of the leveling-tool, the latter rotates without moving endwise; but when the said median line extends obliquely to the said axis the tool is moved endwise by the back-and-forth movements of the sole, the reduced central portion of the tool remaining in contact with the highest portion of the sole.

It will be seen that the ribbed perimeter of the leveling-tool, each rib being formed by a loose roll of relatively small diameter, enables the tool to act with greater rapidity and effectiveness than would be possible if the tool were a single smooth-surfaced roll or a ribbed roll with ribs made rigid with the roll or forming integral parts thereof. The arrangement of the rolls in two series, each converging inwardly toward the axis of the tool, in connection with the longitudinal taper and curvature of the rolls, enables the ribbed surface to impart the exact desired transverse curvature to the sole. The extension of the inner ends of one series of rolls beyond or between the inner ends of the other series makes the ribbed perimeter practically continuous from end to end of the tool.

The jack-spindle $h^{10}$ is affixed to a block $h^{13}$, which is pivoted at $h^{14}$ to the standard $h^9$. A spring-arm $h^{15}$ is affixed to the said block and projects downwardly therefrom, its lower end bearing against a slide $h^{16}$, which is movable in a guide $h^{17}$ on the inner yoke $h$.

$h^{18}$ represents a toggle-link pivoted to the yoke $h$ and to a toggle-link $h^{19}$, the latter being pivoted to the slide $h^{16}$. The link $h^{18}$ has an extension, forming an operating-lever $h^{20}$. When this lever is raised, as shown in Fig. 7, the links are deflected and the spring $h^{15}$ is not under strain, so that the spindle $h^{10}$ is relatively loose and is adapted to easily enter the spindle-socket in the last. When the lever $h^{20}$ is depressed, as shown in Fig. 8, the links are forced into alinement and the slide $h^{16}$ is pressed against the lower end of the spring in such manner as to deflect and put the same under tension, thus causing the spindle to bind on the wall of the socket in the last and secure the last firmly in place. The spindle is thus adapted to conform to the socket, whatever may be the inclination of the latter. The spindle-sockets of different lasts vary in inclination, so that when the jack-spindle is rigid on the jack some difficulty is likely to be experienced in engaging the last with it. This difficulty I overcome by the means above described.

The toe-rest standard $h^{12}$ is adjustably connected with the standard $h^9$ by a screw-threaded rod $h^{21}$, journaled at one end in a socket on the standard $h^9$ and engaged with a nut $h^{22}$, pivoted in a slot in the standard $h^{12}$.

$m\ m$ represent two disks mounted on the lower ends of two oppositely-inclined shafts $m'\ m'$, which are journaled in bearings $m^2 m^2$, mounted on the frame of the machine. The disks are rotated in opposite directions, as indicated by the arrows in Figs. 1 and 9, and their under surfaces are arranged to act on the sole at and near the edges thereof, the said surfaces rubbing the sole outwardly from opposite sides of its median line toward its edges, thus pressing the channel-flap down to place. The shafts $m'$ are rotated by belts running from pulleys $m^3$ on a shaft $m^4$ to pulleys $m^5$ on the shafts $m'$, the shaft $m^4$ being driven by a belt from the driving-shaft. The shafts $m'$ and disks $m$ are preferably permitted to yield upwardly, the shafts $m'$ being movable lengthwise in their bearings and pressed downwardly by springs $m^6$. The bearings $m^2$ of the shafts $m'$ are formed on yokes $m^7$, which are mounted on studs $m^8$, having clamping-nuts which enable the yokes to be loosened and set at any desired angles.

It will be seen that the disks $m$ act on the sole just in advance of the leveling-tool, laying the channel-flap, and thus preparing the same for the action of the leveling-tool. To enable the disks $m$ to move with the endwise movements of the leveling-tool, I provide a carriage $m^9$, which supports the yokes $m^7$ and shaft $m^4$, said carriage being affixed to the shaft $b$ of the leveling-tool. The disks, therefore, conform to all changes of longitudinal position of the leveling-tool.

Figure 11:
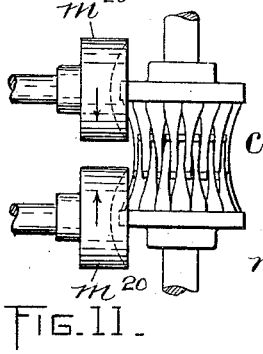

The acting surfaces of the disks $m$ $m$ may be corrugated radially to increase their effectiveness. Said acting surfaces instead of being the sides of flat disks may be the peripheries of oppositely-rotating cylindrical rolls $m^{20}$ $m^{20}$, arranged, as shown in Fig. 11, relatively to the leveling-tool, said rolls being rotated in opposite directions.

Figure 12:
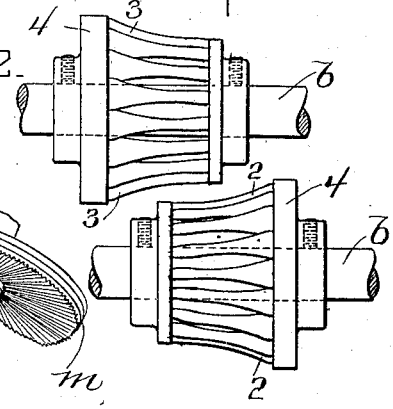

Fig. 12 shows a modification in which the rolls 2 2 are grouped together to form a tool-section, which is larger at one end than at the other, while the rolls 3 3 are grouped together to form another tool-section, said sections being arranged side by side. The two parts or sections shown in this modification constitute an equivalent of the tool shown in Fig. 5.

It is obvious that the improved leveling-tool above described may form a part of a machine organized to give the leveling-tool a back-and-forth movement over the jack or any other suitable movement or movements of translation.

In Figs. 13 and 14 I show a modified construction of the leveling-tool, in which the inner ends of the rolls 2 and 3 are supported by a single intermediate hub 8, having beveled sides, on which are formed short inclined socketed bosses 9. The socketed inner ends of the rolls are journaled on said bosses, and the socketed ends of the latter receive the inner ends of shafts 10, which extend through the rolls, their outer ends being journaled in bearings 12, formed in the end hubs 4 4. Said bearings are surrounded by bearings 13, which receive the outer ends of the rolls.

Having thus explained the nature of my invention and described a way of constructing and using the same, although without having attempted to set forth all the forms in which it may be embodied or all the modes of its use, I declare that what I claim is—

1. A rotary leveling-tool having a ribbed perimeter longitudinally shaped to conform to the transverse curvature of a sole and composed of independent rolls which are greater in number at the central portion of said perimeter than at either of the end portions thereof.

2. A rotary leveling-tool having a ribbed perimeter longitudinally shaped to conform to the transverse curvature of a sole and composed of independent rolls which are greater in number and less in diameter at the central portion of said perimeter than at either of the end portions thereof.

3. A rotary leveling-tool having a ribbed perimeter longitudinally shaped to conform to the transverse curvature of a sole and composed of independent rolls, each of varying diameter, forming units of the periphery, the central portion or zone of the perimeter being composed of a greater number of rolls than either end portion or zone.

4. A rotary leveling-tool having a ribbed perimeter and comprising a plurality of sets of axially-arranged rolls, the combined contour of the complemental units of said sets corresponding to the shape to be given to the sole of the boot or shoe.

5. A rotary leveling-tool having a ribbed perimeter longitudinally shaped to conform to the transverse curvature of a sole and comprising two sets of rolls arranged around a common axis, means for supporting the outer ends of the rolls, and means for supporting the inner ends of said rolls nearer said axis than the outer ends.

6. A rotary leveling-tool having a ribbed perimeter shaped to conform to the transverse curvature of a sole and composed of rolls the axes of which are oblique to the axis of the tool.

7. A rotary leveling-tool having a ribbed perimeter shaped to conform to the transverse curvature of a sole and composed of a plurality of series of obliquely-arranged rolls.

8. A rotary leveling-tool having a ribbed perimeter composed of a plurality of series of obliquely-arranged rolls, the inner ends of the rolls of one series alternating with the inner ends of the rolls of another series.

9. A rotary leveling-tool comprising a series of obliquely-arranged rolls whose axes converge in one direction, another series of rolls whose axes converge in the opposite direction, outer bearings for the outer ends of the two series of rolls, and intermediate bearings for the inner ends of the two series of rolls.

10. A rotary leveling-tool comprising two end hubs, intermediate hubs of smaller diameter than the said end hubs, and two series of rolls rotatively engaged with said hubs and supported obliquely thereby, the relative arrangement of the said hubs being such that the inner ends of the rolls of one series extend between the inner ends of the rolls of the other series.

11. In a sole-leveling machine, the combination of a rotary leveling-tool having enlarged end portions and a reduced central portion, said tool being movable lengthwise of its axis, and a pivoted jack arranged to hold a sole between the enlarged end portions and against the reduced central portion of the tool, said jack having a back-and-forth movement substantially at right angles with the axis of the tool, and means whereby said jack may be turned to vary the direction of the median line of the sole relatively to said axis.

12. In a sole-leveling machine, the combination of a rotary leveling-tool having enlarged end portions and a reduced central portion, said tool being movable lengthwise of its axis, a jack having a back-and-forth movement substantially at right angles with the axis of the tool and adapted to be turned to vary the direction of the median line of the sole relatively to said axis, and means for yieldingly holding the leveling-tool in a central position.

13. In a sole-leveling machine, the combination of a leveling-tool, a jack movable into and out of contact with the tool, and means made operative by a movement of the jack toward the tool for imparting a back-and-forth movement to the jack.

14. In a sole-leveling machine, the combination of a leveling-tool, a jack movable into and out of contact with the tool, and mechanism for imparting a back-and-forth movement to the jack, said mechanism including a clutch the members of which are separable by a downward movement of the jack, and automatic means for engaging said members when the jack is raised.

15. In a sole-leveling machine, the combination of a leveling-tool, a jack movable into and out of contact with the tool, a crank-shaft connected with the jack, a clutch member on the crank-shaft, a complemental clutch member rotated by the power of the machine, a movable support for said complemental member arranged to be moved in one direction by the jack to separate the two members, and means for yieldingly moving said support in the opposite direction to engage the two clutch members.

16. The combination of a leveling-tool, two rotatable flap-laying devices arranged to act on a jack-supported sole at a point in advance of the leveling-tool, and means for simultaneously rotating said leveling-tool and flap-laying devices, said means having provisions for rotating the flap-laying devices in opposite directions.

17. The combination of a jack having a back-and-forth movement and adapted to be turned to vary the direction of the median line of the sole, a leveling-tool arranged to act on a sole supported by the jack and having a reduced central portion and enlarged end portions, and two oppositely-rotating flap-laying devices arranged to act on a jack-supported sole at a point in advance of the leveling-tool, the said leveling-tool being movable lengthwise by the jack, and connections between the said tool and the flap-laying devices, whereby the latter are caused to move with the endwise movements of the tool.

18. A sole-leveling machine, comprising a rotary leveling-tool, a jack including an inner yoke having last-holding devices and adapted to be moved in the directions required to tip the last sidewise, an outer yoke supporting the inner yoke, a support for the outer yoke to which the latter is connected by a substantially vertical pivot whereby the outer yoke and the inner yoke supported thereby are adapted to be moved in the directions required to vary the direction of the median line of the last relatively to the axis of the tool, a handle whereby the described movements may be imparted to both the inner and outer yokes, a treadle-lever, and connections between the said lever and the jack, whereby the jack may be moved bodily toward the leveling-tool.

In testimony whereof I have affixed my signature in presence of two witnesses.

HAROLD A. WEBSTER.

Witnesses:
C. F. BROWN,
E. BATCHELDER.